(No Model.)

W. H. LEWIS.
PHOTOGRAPHIC CAMERA.

No. 360,314. Patented Mar. 29, 1887.

WITNESSES:
Donn Twitchell
C. Sedgwick

INVENTOR:
W. H. Lewis
BY
Munn & Co
ATTORNEYS.

N. PETERS, Photo-Lithographer, Washington, D. C.

UNITED STATES PATENT OFFICE.

WILLIAM H. LEWIS, OF BROOKLYN, ASSIGNOR TO E. & H. T. ANTHONY & CO., OF NEW YORK, N. Y.

PHOTOGRAPHIC CAMERA.

SPECIFICATION forming part of Letters Patent No. 360,314, dated March 29, 1887.

Application filed December 28, 1886. Serial No. 222,790. (No model.)

*To all whom it may concern:*

Be it known that I, WILLIAM H. LEWIS, of Brooklyn, in the county of Kings and State of New York, have invented new and useful Improvements in Photographic Cameras, of which the following is a full, clear, and exact description.

This invention consists in certain devices and constructions and combinations of parts in a photographic camera, substantially as hereinafter shown and described, the same including novel means for focusing and indicating the focus in connection with a sliding ground-glass and plate-holder carrier and a lens or lens-tube, which has or may have a fixed position; also, a detachable receptacle or case at the back of the camera for holding a number of plates to be used in the camera, as required, said receptacle or case, when attached to the camera-box, also serving as a hood to the camera when focusing, and when detached as a convenient plate-holding case that may be carried separately from place to place, and be subsequently attached to the camera-box to form a dark-chamber and hood in the rear of it, as required.

Reference is to be had to the accompanying drawings, forming a part of this specification, in which similar letters of reference indicate corresponding parts in all the figures.

Figure 1:
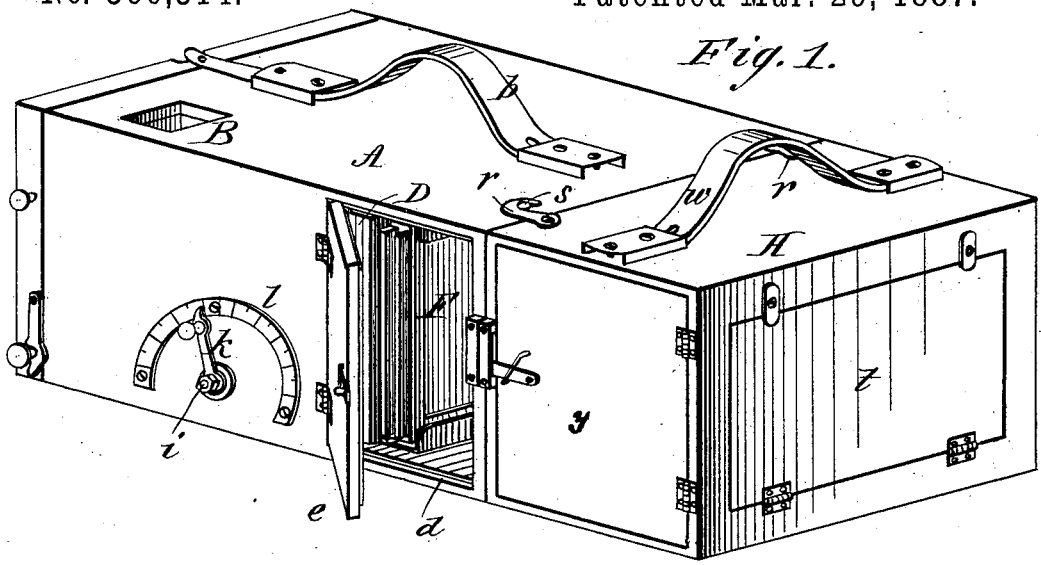
Figure 2:
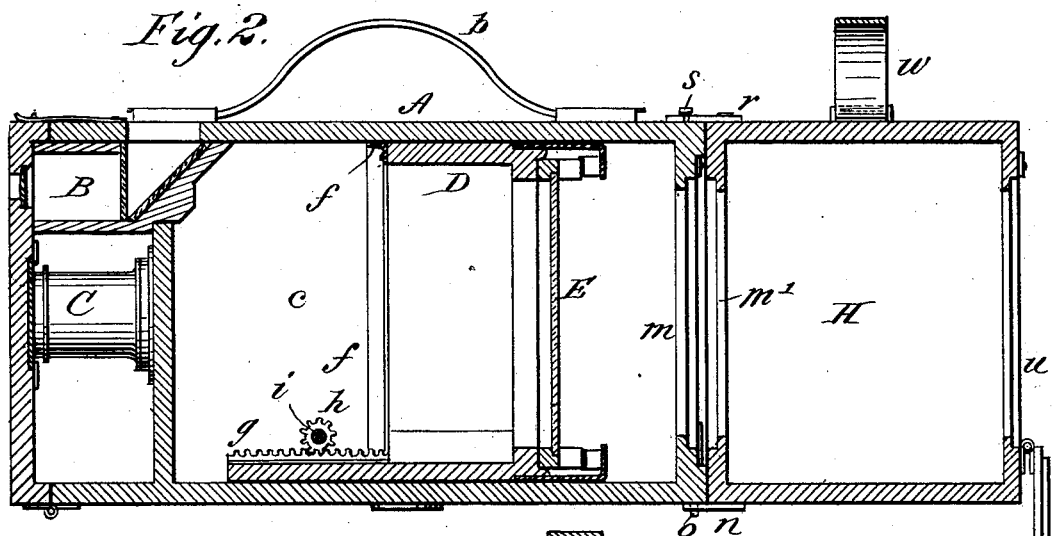
Figures 3, 4:
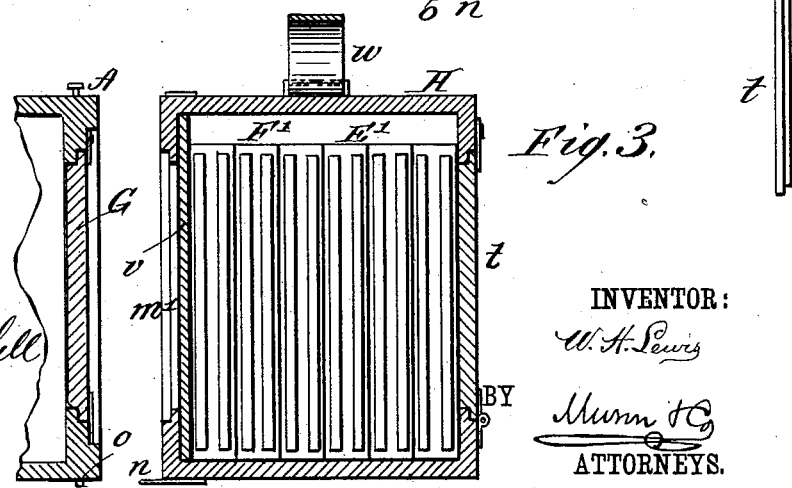

Figure 1 represents a perspective view of a photographic camera embodying my invention, with the detachable plate-carrying receptacle attached and closed, and with a door in the side of the camera-box for insertion and removal of the ground glass or plate to be photographed. Fig. 2 is a longitudinal vertical section of the same with the parts in position for focusing. Fig. 3 is a vertical transverse section of the combined plate-carrying case or receptacle and hood detached and as packed with sensitized plates, and Fig. 4 is a vertical transverse section of the rear end of the camera-box with the plate-carrying case removed and as closed by a temporary lid.

A indicates the camera-box, which is here shown as provided with a finder, B, that may be omitted, if desired, and which may further be provided with a handle, b.

C is a fixed or stationary photographing lens-tube in the front portion of the camera-box in advance of a dark-chamber, c, and which may be controlled by any suitable shutter. Within this chamber c of the camera-box, which is not made extensible—that is, is not provided with a bellows—is a sliding frame or box, D, capable of longitudinal adjustment in said chamber to, provide for focusing the image and holding the plate to be photographed at the proper distance from the lens, said frame being constructed to carry, by suitable slideways in its rear, either the ground glass E, used in focusing, or the plate-holder F, which may either be a single or a double one, and be fitted with the usual sliding shutter or shutters.

The interchangeable ground glass and plate-holder may be respectively slid to or removed from their place in the rear portion of the sliding frame D by suitably adjusting said frame to bring it opposite a doorway, d, in the side of the camera-box, and which is closed by a lid or door, e, when the camera is in use and when it is not required to insert or remove either the ground glass or plate-holder. This sliding box or frame D, or "ground-glass and plate-holder carrier," as it may be termed, is packed at its sides, as by rubber strips f, or otherwise, where it comes in contact with the walls of the camera-box, and is made adjustable along and within the camera-box to its required distance from the lens by an attached rack, g, and pinion h, gearing therewith. The spindle i of the pinion h passes out through the side of the camera-box A, to provide for its manipulation from the exterior when focusing, and is fitted on its outer end with an index or pointer, k, that may also serve as a handle by which to manipulate or turn the spindle and its pinion. This index is arranged to travel over a dial, l, graduated to indicate distances, whereby the requisite adjustment of the ground-glass and plate-holder carrier D for a given or known focus may be readily ascertained, and be repeated when required to duplicate or repeat the taking of the photograph from a like distance from the object, thus saving much time and labor.

The rear end of the camera-box A has an enlarged opening, m, in it, closed, when required, by a removable lid, G, held in place by suitable steps and fastenings.

H is a receptacle or case for holding any number of sensitized plates or sheets for use in the camera as required. This receptacle or case is attachable to and detachable from the rear end of the camera-box—as, for instance, by one or more lower perforated attached plates, n, arranged to engage or fit up over a corresponding number of downwardly-projecting pins, o, on the under side of the rear end of the camera-box, and one or more pivoted hooks, r, on the top of the receptacle H, arranged to engage with and disengage from pins or screws s upon the upper portion of the rear end of the camera-box; or any other suitable fastenings may be used to provide for the ready attachment and detachment of the case H from the rear end of the camera-box.

When the plate-case H is attached to the camera-box, the plates which it serves to carry are removed from it, as shown in Fig. 2, and it virtually forms a rear extension of the camera body or box and makes a close joint with the rear end of the camera-box proper, with the interior of which it is in communication by an opening, m', in its front side corresponding with the opening m in the back of the camera-box. It then forms a continuation of the dark-chamber of the camera-box, and, upon opening a lid or door, t, which closes an opening, u, in the rear of the case, constitutes a hood, dispensing with the usual black cloth or separate hood to the camera used in focusing.

When said case H is detached from the camera, then the lid G is fitted to its place or made to close the opening m in the rear end of the camera-box, and the lid or door t of the case H closed, and also a temporary board or lid, v, inserted in the case or applied to it to close the opening m'. The case H is then ready for use as a plate-carrying receptacle, and which may be provided with a separate handle, w, for carrying it when moving it about from place to place, for use in connection with any camera, as described. The sensitized plates or sheets which are packed in it when the case H is used as a convenient plate-carrying receptacle, and which may either be separately carried in said receptacle or be contained within a series of plate-holders, F', may be introduced within the case, or be removed from it, as required, as may also the temporary board v, through an opening in the side of the case closed by a door, y. This combined hood and plate-carrying receptacle or case H will, from its separate and easy portability, be found a very handy adjunct for cameras of different kinds.

It essentially differs from a mere detachable single plate-holder slid to its place in rear of the camera-box and provided with the usual adjustable dark-slide and adjustable semi-transparent focusing-glass, such as has before been used, and which serves to hold the plate while the picture is being taken, and does not form a hood, nor yet a receptacle for a series of plates or plate-holders to be taken from it and used, as required, in the camera-box.

Having thus fully described my invention, I claim as new and desire to secure by Letters Patent—

1. In a photographic camera, the combination, with the camera box or body, of a ground-glass and plate-holder carrier adjustable within and along said box to and from the lens of the camera, means adapted to adjust said carrier from the exterior of the box, and an exposed attached index and dial for determining said adjustment, substantially as specified.

2. The combination of the camera box or body A, having an opening closed by a lid or door adapted to provide for the transverse insertion and removal successively of a focusing ground glass and a plate-holder, the stationary lens-tube C, the ground-glass and plate-holder carrier D, adjustable within and along said box to and from the lens, the rack g, attached to said carrier, the pinion h, engaging with said rack, the pinion-spindle i, arranged to extend through the camera-box to the exterior thereof, the index k, and the dial l upon the exterior of the box, essentially as described.

3. The combination, with a camera-box open in its rear, of a detachable and convertible hood and sensitized-plate-carrying receptacle, substantially as specified.

4. The combined hood and plate-carrying receptacle or case H, made readily attachable to and detachable from the rear open end of the camera box or body and virtually forming a detachable extension of said body, the same being adapted to carry a series of sensitized plates or plate-holders for separate use, as required, within the main portion of the camera-box, and being provided with front and back openings, m' u, and lids or doors for closing said openings, essentially as and for the purposes herein set forth.

5. The detachable combined hood and plate-carrying receptacle H for photographic cameras, having openings m' u in its opposite ends or faces, lids or doors closing said openings, and a separate opening adapted to provide for the insertion and removal of said plates, and a lid or door closing said separate opening, substantially as specified.

WILLIAM H. LEWIS.

Witnesses:
C. SEDGWICK,
E. M. CLARK.